(12) United States Patent
Ziebell

(10) Patent No.: US 9,139,372 B2
(45) Date of Patent: Sep. 22, 2015

(54) RESCUE AUGER

(71) Applicant: John Ziebell, Hubbard, IA (US)

(72) Inventor: John Ziebell, Hubbard, IA (US)

( * ) Notice: Subject to any disclaimer, the term of this patent is extended or adjusted under 35 U.S.C. 154(b) by 0 days.

(21) Appl. No.: 14/483,519

(22) Filed: Sep. 11, 2014

(65) Prior Publication Data

US 2015/0068872 A1 Mar. 12, 2015

Related U.S. Application Data

(60) Provisional application No. 61/876,632, filed on Sep. 11, 2013.

(51) Int. Cl.
*B65G 33/14* (2006.01)
*B65G 33/34* (2006.01)
*B65G 33/00* (2006.01)
*B65G 69/08* (2006.01)
*B65G 65/46* (2006.01)

(52) U.S. Cl.
CPC .............. *B65G 33/14* (2013.01); *B65G 65/463* (2013.01); *B65G 33/34* (2013.01)

(58) Field of Classification Search
None
See application file for complete search history.

(56) References Cited

U.S. PATENT DOCUMENTS

| 2,569,871 | A | * | 10/1951 | Roscoe et al. | 198/674 |
| 6,120,233 | A | * | 9/2000 | Adam | 414/502 |
| 2013/0223960 | A1 | * | 8/2013 | Schoenfeld et al. | 414/292 |

FOREIGN PATENT DOCUMENTS

EP 2172109 A2 * 4/2010

* cited by examiner

*Primary Examiner* — Kavel Singh
(74) *Attorney, Agent, or Firm* — Mark David Torche; Patwrite LLC

(57) ABSTRACT

A rescue auger has a transport tube that is approximately five feet long with a spout having an angled portion that is disposed on top of the transport tube to direct grain out from the transport tube. An auger is located within the transport tube to direct grain up and out towards the spout when rotated. An electric drill is used to operate the rescue auger by attaching the drill to a triangle shank on an exposed portion of the auger shank. An intake guard surrounds a lower portion of the transport tube and has a diameter a little larger than the diameter of the transport tube. A handle is located on a portion of the spout and allows a user to position and hold the rescue auger during use. The rescue auger is used in conjunction with a rescue tube which is first placed around the trapped victim.

9 Claims, 6 Drawing Sheets

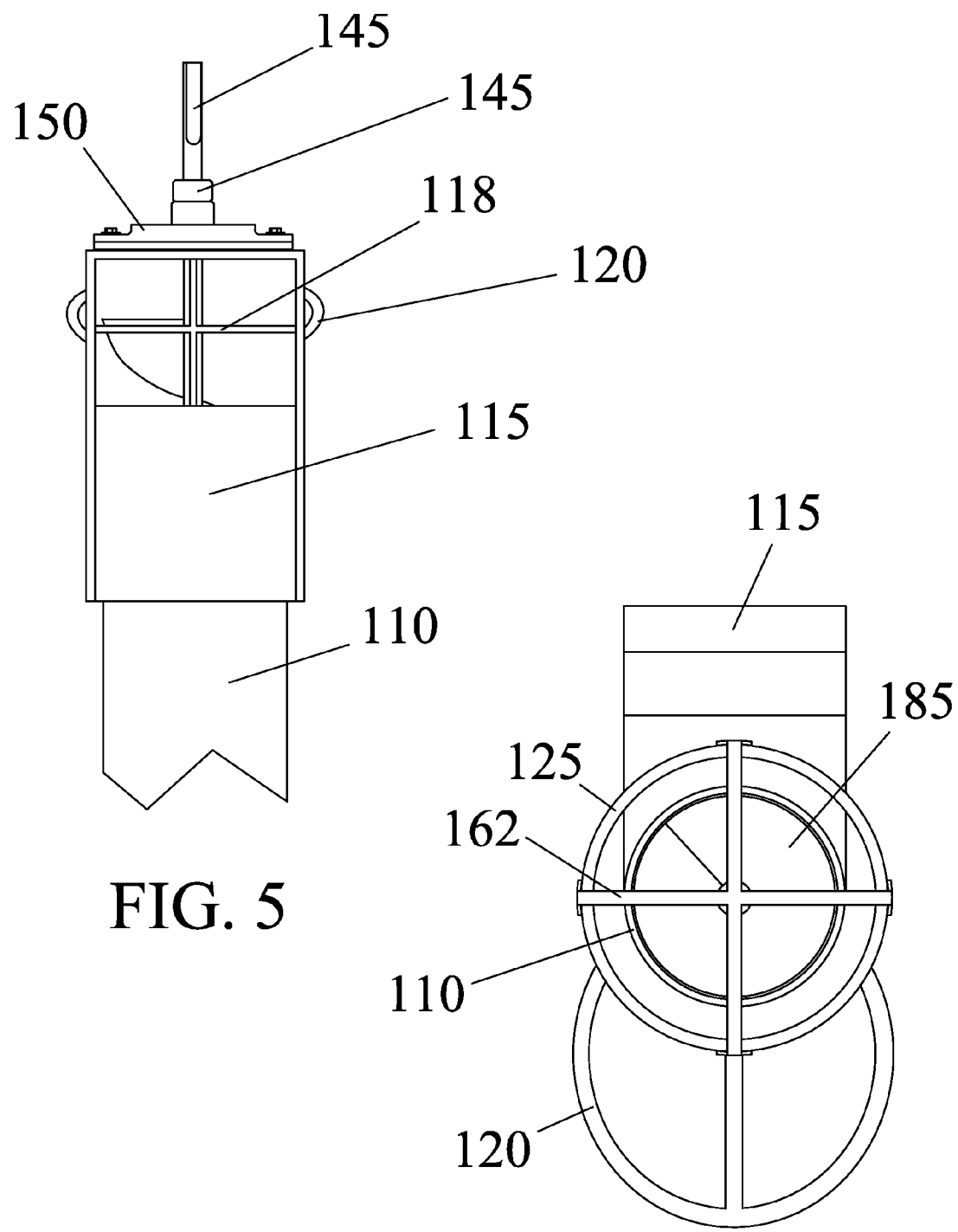

RESCUE AUGER

CROSS REFERENCE TO RELATED APPLICATIONS

This application claims priority and herein incorporates by reference U.S. provisional patent application 61/876,632, filed Sep. 11, 2013.

BACKGROUND OF THE INVENTION

Every year people die by being trapped in grain storage bins. Even a physically fit person can become completely trapped in less than 30 seconds and many are killed or injured trying to facilitate a rescue. According to some experts, a worker can become completely submerged by the grain in five seconds and half of all grain accidents result in death by suffocation. Grain bins are often located in semi-isolated areas and help can arrive too late to save the person and even with help, it is often impossible to get the person out in time. Some studies indicate that despite educational efforts, grain bin accidents are actually on the rise.

There is a need for a safe and portable device that can remove grain from around a trapped person in time to save their life that is operable in remote locations.

SUMMARY OF THE INVENTION

A rescue auger has a transport tube that is approximately five feet long with a spout having an angled portion that is disposed on top of the transport tube to direct grain out from the transport tube. An auger is located within the transport tube to direct grain up and out towards the spout when rotated. An electric drill is used to operate the rescue auger by attaching the drill to a triangle shank on an exposed portion of the auger shank. An intake guard surrounds a lower portion of the transport tube and has a diameter a little larger than the diameter of the transport tube. A handle is located on a portion of the spout and allows a user to position and hold the rescue auger during use. The rescue auger is used in conjunction with a rescue tube which is first placed around the trapped victim.

Other features and advantages of the instant invention will become apparent from the following description of the invention which refers to the accompanying drawings.

BRIEF DESCRIPTION OF THE DRAWINGS

FIG. 5 is a detailed partial front view of the rescue auger shown in FIG. 1.

FIG. 6 is a bottom view of the rescue auger shown in FIG. 1.

DETAILED DESCRIPTION OF THE INVENTION

Figure 1:
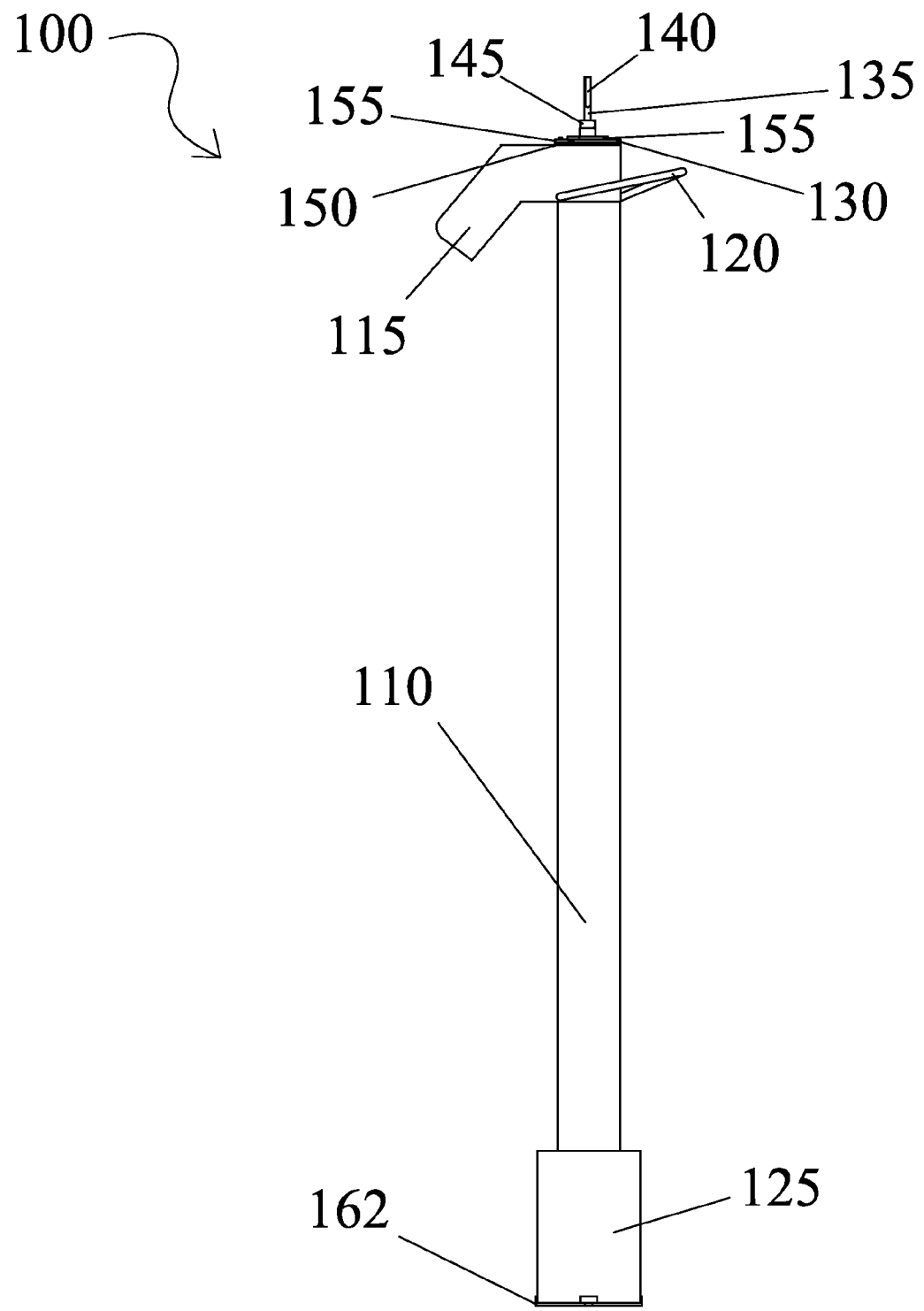
FIG. 1 is a side view of a rescue auger according to an embodiment of the present invention.
Figure 2:
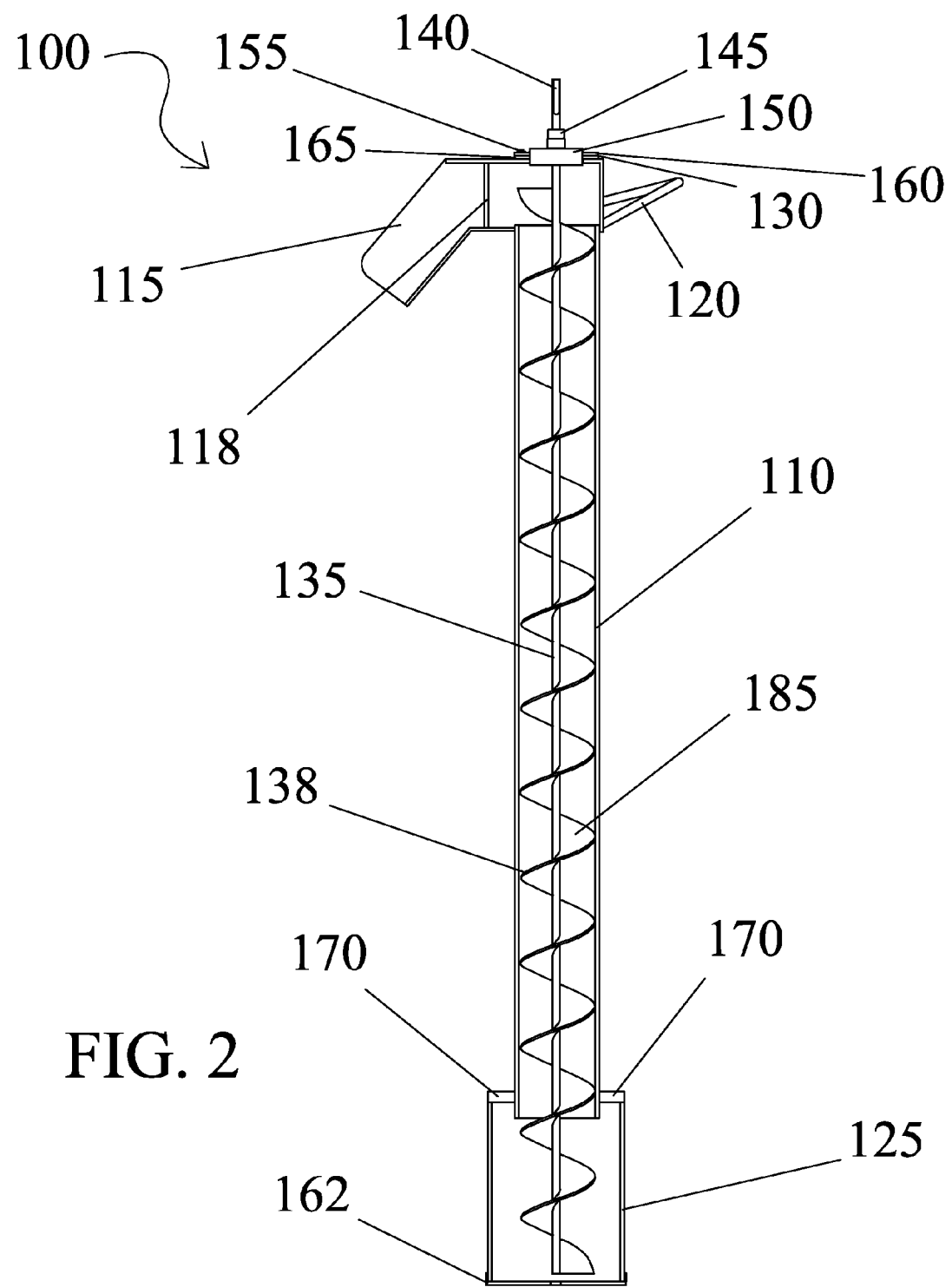
FIG. 2 is a cut-away side view of the rescue auger shown in FIG. 1.
Figure 3:
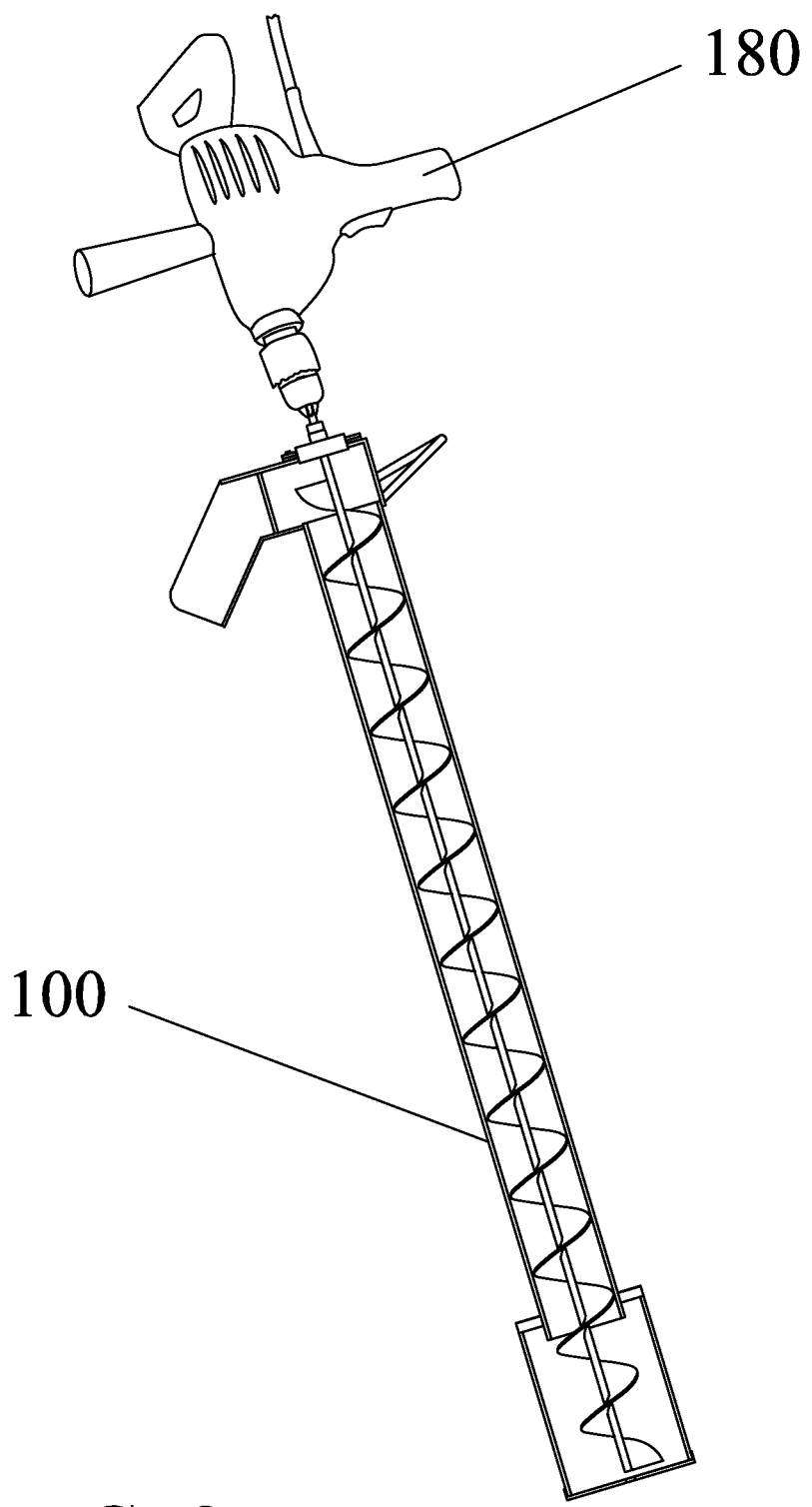
FIG. 3 is a cutaway side view of the rescue auger shown in FIG. 1 operated by a portable drill.
Figure 4:
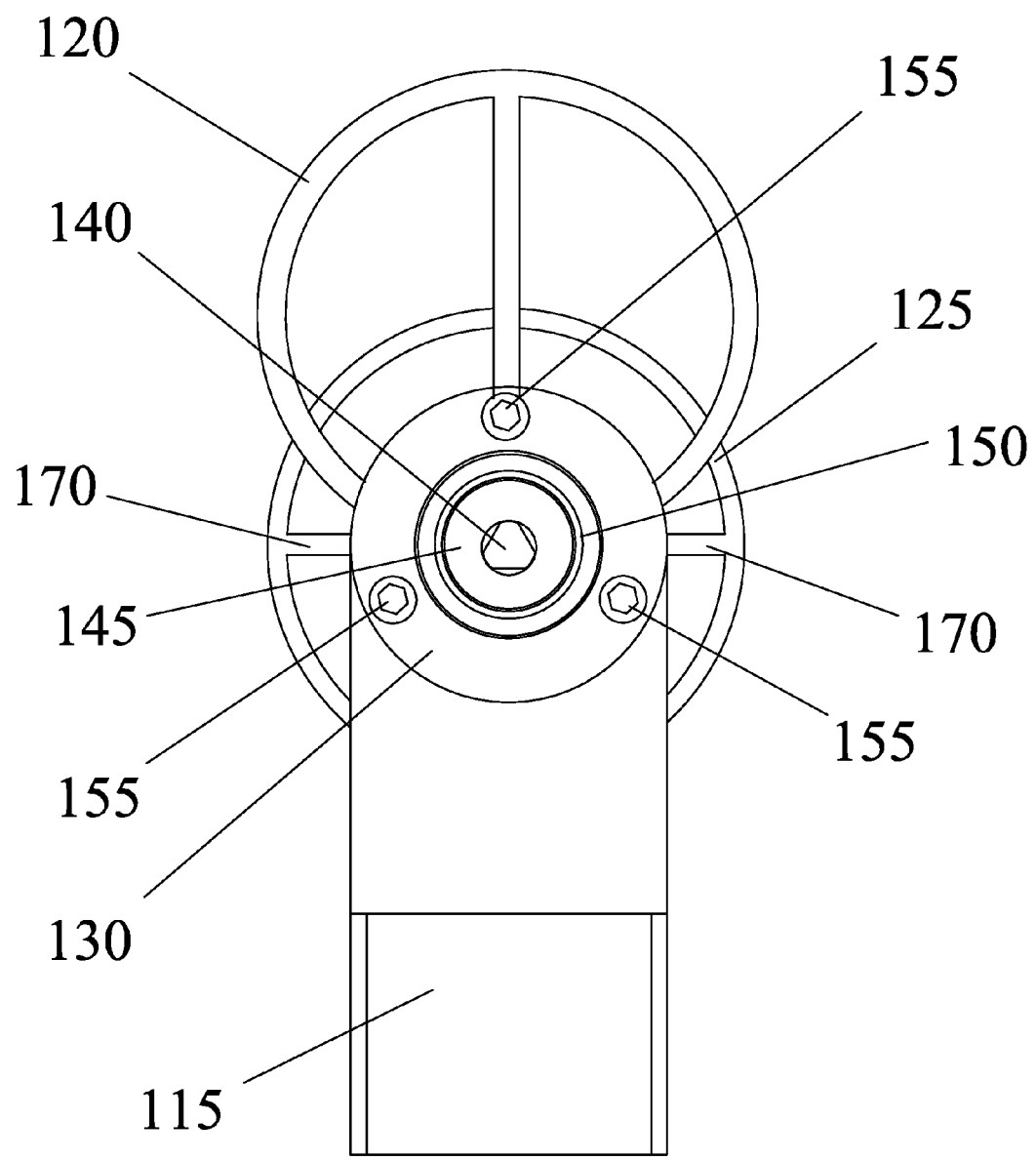
FIG. 4 is a top view of the rescue auger shown in FIG. 1.

In the following detailed description of the invention, reference is made to the drawings in which reference numerals refer to like elements, and which are intended to show by way of illustration specific embodiments in which the invention may be practiced. It is understood that other embodiments may be utilized and that structural changes may be made without departing from the scope and spirit of the invention.

Referring to the figures, a rescue auger 100 is shown having a transport tube 110 with a spout 115 disposed on a top portion of tube 110 to direct grain 210 out of transport tube 110. An auger shaft 135 has auger flighting 185 welded thereon to form an auger 138 that moves the grain 210 up and out. Of course other forms of augers may be used such as extruded or other manufacturing methods as long as it is capable of transporting grain up and through transport tube 110 as is known in the art. Auger 138 fits within an inside diameter of transport tube 110 and is supported at a top end by a bearing 150. Bearing 150 is supported and contained by a bearing flange 130 which is made up of a top flange plate 160 and a bottom flange plate 165.

Spout 115 fits over transport tube 110 and bearing 150 is secured therein by bolts 155 which fit within threaded holes in a top portion of spout 115. Washers and lock washers may be used to secure bolts 155 as is known in the art. Of course other methods of securing bearing 150 to spout 115 may be used such as welding as long as the bearing is held firmly in place allowing auger to spin.

Transport tube 110 is of a length that facilitates moving grain 210 up and out from around a trapped victim 215 which has been trapped in a grain storage bin (not shown) and surrounded by a rescue tube 205. Rescue tubes are known in the art and help reduce the amount of grain that needs to be removed before trapped victim 215 may be extracted from grain 210 and to stabilize trapped victim 215. Transport tube 110 should not reach beyond rescue tube 205 to prevent grain from being pulled out from outside rescue tube 205 in order to prevent trapped victim 215 from sinking further into grain 210. The height of most rescue tubes is about five feet. Transport tube 110 is generally about five feet in length to match rescue tubes. Transport tube 110 has a diameter about 3 inches with matching auger 182 that rotates within. If the length of transport tube 110 is too long, it can start to collapse the space under the person to be rescued and pull grain from the outside.

A triangle shank 140 is formed on the end of auger shaft 135 to enable use in an electric drill 180, cordless drill 182 or other rotating tool. Triangle shank 140 provides high torque transmission to ensure that the grain is rapidly removed. Of course other connecting shafts may be used, including but not limited to, hex shanks, SDS (Special Direct System) shanks, square shank, etc. or other suitable means of rotating auger shaft 135 using a rotating power tool. A lock collar 145 fits above bearing 150. Lock collar 145 is secured using set screw (not shown) to prevent it from moving as is known in the art. Bearing 150 is a ball bearing fitted over auger shaft 115 to minimize rotational friction while rotating. Of course any suitable bearing may be used, such as but not limited to roller bearings or bushings. The angle of auger flighting 185 is chosen to provide suitable lifting speed to extricate trapped victim 215 and to be most efficient when operated at the average speed of drills which is known in the art.

An intake guard 125 is disposed on a bottom portion of transport tube 110 and secured with struts 170 that allow grain to flow in and through as it is directed towards auger 138 to be carried up and away while keeping other objects and body parts out of reach of the auger portion. Intake guard 125 is a small tube having a larger diameter than transport tube 110 to help direct and pull grain 210 into and up auger 138 to be ejected through spout 115 and away from victim 215. A bottom guard 162 is provided to further isolate the spinning auger 138 from the possibility of accidental contact. Although shown as a simple cross-shaped guard, other shapes are possible as long as it does not prevent grain from entering while protecting the user from injury during operation. A handle 120 is provided to allow a user to position and move rescue auger 100 in use. Transport tube 110 and spout 115 are made of steel but other suitable materials may be used such as fiberglass, composites, aluminum, etc. as long as the chosen material is strong enough to transport the grain up and away from victim 215.

Drill 182 has a chuck that grasps triangle shank 140 to provide the rotational torque needed to rotate auger 138. Drill 182 is generally a standard ½ inch or ¾ inch drill. Of course other devices may be used such as a pneumatic drill, etc. as long as the tool can provide sufficient rotational power to rotate auger 138 at a speed sufficient to remove grain 210 from around victim 215. Because the chuck fits around triangle shank 140, auger 138 is positively turned without slippage. Using most standard drills, this combination results in a flow rate of about one bushel of grain per minute which greatly reduces the time required to rescue victim 215.

Referring to FIG. 5, a partial front view of rescue auger 100 has an upper guard 118 welded to an inside of spout 115 to protect users from accidentally being injured by rotating auger 138.

Figure 7:
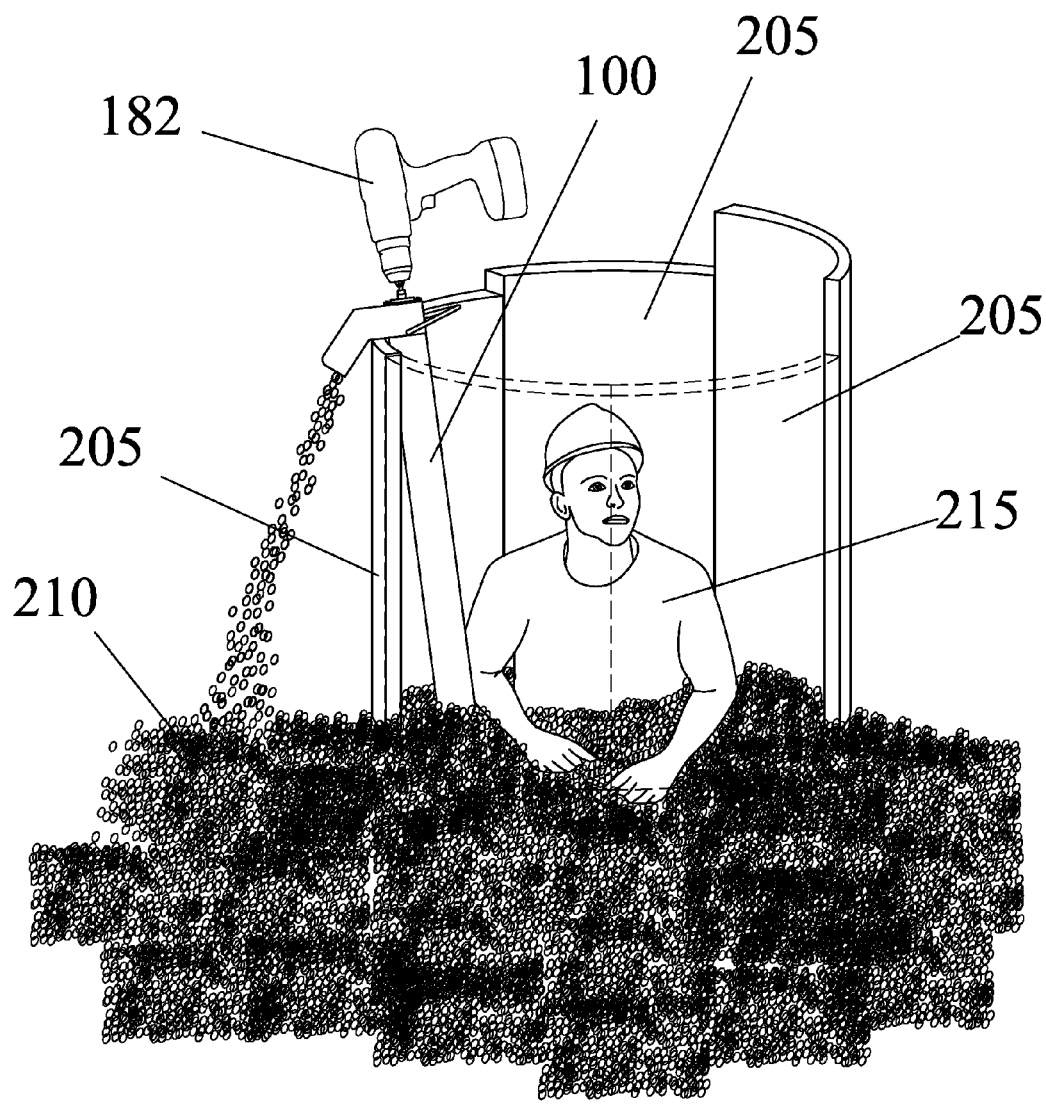
FIG. 7 is an illustration of the rescue auger in use.

Referring to FIG. 7, a typical rescue operation is shown by first surrounding trapped victim 215 with rescue tube 215 to create an enclosed space around a portion of trapped victim 215. Once trapped victim 215 has been surrounded and stabilized, rescue auger 100 is lifted up and over rescue tube 215 and resting the bottom portion of rescue auger 100 on grain 210. It is not necessary to push the end down into grain 210 since once drill 182 is energized, the auger action will draw rescue auger down into grain 210. Rescue auger 100 will rest on top of an upper wall of rescue tube 205 to prevent it from being pulled further down in grain 210. Grain 210 will then be transported up through transport tube and directed out away from trapped victim 215 through spout 115. Once enough grain 210 is removed, trapped victim will be able to be pulled out from any remaining grain.

Although the instant invention has been described in relation to particular embodiments thereof, many other variations and modifications and other uses will become apparent to those skilled in the art.

What is claimed is:

1. A hand-held rescue auger for use in rescuing a victim trapped by grain in a grain storage bin comprising:
   a transport tube;
   a spout disposed on an upper end of said transport tube;
   an auger rotatably disposed within said transport tube wherein grain is transported up through said auger and out said spout when said auger is rotated;
   said transport tube having a diameter selected to match an outer diameter of said auger wherein grain is moved without being trapped between said auger and said transport tube;
   said transport tube having a length selected to match a rescue tube which surrounds a trapped victim wherein grain is removed from within an enclosed space defined by an interior portion of said rescue tube;
   an auger shaft centrally disposed on said auger wherein an auger flighting is disposed around said auger shaft which directs grain up towards said spout when said auger is rotated; and
   a shank portion disposed on an upper end of said auger shaft adapted to fit within a rotating power tool; and
   a handle disposed on a portion of said spout;
   said handle configured to be gripped by an operator's hand wherein said hand-held rescue auger is positioned by said operator to quickly remove grain from around said victim.

2. The rescue auger for use in rescuing a victim trapped by grain in a grain storage bin according to claim 1 further comprising;
   an intake guard disposed along a lower end of said transport tube;
   said intake guard having a diameter larger than a diameter of said transport tube; and
   said intake guard being supported on said lower end of said transport tube by a plurality of struts wherein grain can flow around said struts and enter said lower end of transport tube.

3. The rescue auger for use in rescuing a victim trapped by grain in a grain storage bin according to claim 2 further comprising a bottom guard disposed across a bottom end of said intake guard wherein a user is prevented from contacting said auger.

4. The rescue auger for use in rescuing a victim trapped by grain in a grain storage bin according to claim 1 further comprising an upper guard disposed within a portion of said spout wherein a user is prevented from contacting said auger.

5. The rescue auger for use in rescuing a victim trapped by grain in a grain storage bin according to claim 1 wherein said shank portion is a triangle shank.

6. The rescue auger for use in rescuing a victim trapped by grain in a grain storage bin according to claim 1 wherein said spout has an outer portion angled down to direct grain out and away from said enclosed space.

7. The rescue auger for use in rescuing a victim trapped by grain in a grain storage bin according to claim 1 where said transport tube is generally five feet long.

8. The rescue auger for use in rescuing a victim trapped by grain in a grain storage bin according to claim 1 where said transport tube has a diameter of 3 inches.

9. A method for rescuing a victim trapped by grain in a grain bin using a hand-held rescue auger; the method comprising the steps of:
   surrounding said victim with a rescue tube wherein said victim is surrounded and enclosed by said rescue tube;
   obtaining a hand-held rescue auger; said hand-held rescue auger comprising:
   a transport tube;
   a spout disposed on an upper end of said transport tube;
   an auger rotatably disposed within said transport tube wherein grain is transported up through said auger and out said spout when said auger is rotated;
   said transport tube having a diameter selected to match an outer diameter of said auger wherein grain is moved without being trapped between said auger and said transport tube;
   said transport tube having a length selected to match a rescue tube which surrounds a trapped victim wherein grain is removed from within an enclosed space defined by an interior portion of said rescue tube;
   an auger shaft centrally disposed on said auger wherein an auger flighting is disposed around said auger shaft which directs grain up towards said spout when said auger is rotated; and
   a shank portion disposed on an upper end of said auger shaft adapted to fit within a rotating power tool;
   a handle disposed on a portion of said spout;

said handle configured to be gripped by an operator's hand wherein said hand-held rescue auger is positioned by said operator to quickly remove grain from around said victim;

attaching a power drill to said shank portion of said rescue auger;

energizing said power drill wherein said auger is rotated;

positioning said hand-held rescue auger to a selected position to maximize grain removal; and extricating said victim from said grain bin.

\* \* \* \* \*